US012679638B2

(12) United States Patent
Soper et al.

(10) Patent No.: US 12,679,638 B2
(45) Date of Patent: Jul. 14, 2026

(54) DEBRIS CONTAINMENT APPARATUS

(71) Applicant: KarSwan, LLC, Edmond, OK (US)

(72) Inventors: Katy Soper, Edmond, OK (US); Kelly Poarch, Edmond, OK (US)

( * ) Notice: Subject to any disclaimer, the term of this patent is extended or adjusted under 35 U.S.C. 154(b) by 44 days.

(21) Appl. No.: 18/452,432

(22) Filed: Aug. 18, 2023

(65) Prior Publication Data

US 2024/0059483 A1    Feb. 22, 2024

Related U.S. Application Data

(60) Provisional application No. 63/399,194, filed on Aug. 18, 2022.

(51) Int. Cl.
B65F 1/14        (2006.01)
F16B 2/06        (2006.01)

(52) U.S. Cl.
CPC ............. B65F 1/1426 (2013.01); F16B 2/06 (2013.01); *B65F 2220/101* (2013.01)

(58) Field of Classification Search
CPC ................. B65F 1/141; B65F 2210/18; B65F 2220/1066; A47B 2200/0085; B65D 25/22; F16B 2/065
See application file for complete search history.

(56) References Cited

U.S. PATENT DOCUMENTS

| | | | | |
|---|---|---|---|---|
| 4,423,860 A | * | 1/1984 | Windstrup | ............ B25B 1/2489 |
| | | | | 269/180 |
| 4,802,595 A | * | 2/1989 | Northington | .......... A47B 13/00 |
| | | | | 108/26 |
| 5,294,194 A | * | 3/1994 | Lombardo | .............. A47L 13/52 |
| | | | | 312/308 |
| 6,994,336 B2 | * | 2/2006 | Loo | ........................ A47J 47/005 |
| | | | | 269/302.1 |
| 7,013,771 B2 | * | 3/2006 | Wu | ........................ B25B 25/005 |
| | | | | 81/3.27 |
| 7,798,336 B2 | * | 9/2010 | Shiao | ........................ B25H 3/04 |
| | | | | 211/DIG. 1 |
| 9,089,208 B2 | * | 7/2015 | Zimmerman | .......... A47B 23/02 |
| 9,113,725 B1 | * | 8/2015 | Nipp | .................... A47B 88/407 |
| 10,307,313 B2 | * | 6/2019 | Schroeder | .......... F16M 11/2078 |
| 10,906,697 B2 | * | 2/2021 | Mittag | .................... B65D 25/22 |
| 11,697,525 B2 | * | 7/2023 | Cyzen | .................... A47J 47/00 |
| | | | | 220/23.88 |
| 2006/0016953 A1 | * | 1/2006 | Beck | ........................ A47B 41/06 |
| | | | | 248/460 |

(Continued)

*Primary Examiner* — Bradley Duckworth
(74) *Attorney, Agent, or Firm* — Ferguson Braswell Fraser Kubasta PC

(57)        ABSTRACT

An apparatus for collecting debris displaced from a surface is provided. The apparatus comprises an elongate trough having a first cross-sectional shape of an open channel. The elongate trough comprises a first end of the elongate trough and a first endcap associated with the first end of the elongate trough. The elongate trough comprises a second end of the elongate trough that is distal to the first end of the elongate trough, and a second endcap associated with the second end of the elongate trough. The apparatus further comprises a set of mounting assemblies. The set of mounting assemblies comprises a first mounting assembly associated with the first end of the elongate trough, and a second mounting assembly associated with the second end of the elongate trough.

11 Claims, 12 Drawing Sheets

(56)         References Cited

U.S. PATENT DOCUMENTS

| 2006/0180614 A1* | 8/2006 | Barron | B65D 77/30 |
| | | | 222/215 |
| 2010/0163702 A1* | 7/2010 | Lagobi | A47G 23/0225 |
| | | | 248/311.2 |
| 2011/0232536 A1* | 9/2011 | Moravec | B65F 1/141 |
| | | | 108/26 |
| 2014/0203033 A1* | 7/2014 | Schmidt | B65F 1/141 |
| | | | 220/737 |
| 2015/0336740 A1* | 11/2015 | Buerk | B65F 1/141 |
| | | | 220/636 |

* cited by examiner

Mounting Assembly
140

Head
450

Drive Screw
430

First End
410

Guide Hole
414

Static Jaw
412

Clamp Body
400

Retention Bore
422

Second End
420

Sliding Jaw
440

Apparatus 100

Extensible Member 520

Retention Clip 530

Elongate Trough 110

Retention Clip 530

Extensible Member 520

Extended Position 550

X

Y

Z

DEBRIS CONTAINMENT APPARATUS

CROSS-REFERENCE TO RELATED APPLICATIONS

This application claims the benefit of U.S. Provisional Application Ser. No. 63/399,194, filed Aug. 18, 2022, and entitled "DEBRIS CONTAINMENT APPARATUS," the contents of which are incorporated by reference in their entirety.

BACKGROUND

When working with small or numerous objects on a workspace, some objects may inadvertently be displaced from the workspace surface. Displaced objects may undesirably become lost or misplaced. As a result, these objects are not available for use in performing tasks on the workspace.

SUMMARY

In general, in one aspect, one or more embodiments relate to an apparatus for collecting debris displaced from a surface. The apparatus comprises an elongate trough having a first cross-sectional shape of an open channel. The elongate trough comprises a first end of the elongate trough and a first endcap associated with the first end of the elongate trough. The elongate trough comprises a second end of the elongate trough that is distal to the first end of the elongate trough, and a second endcap associated with the second end of the elongate trough. The apparatus further comprises a set of mounting assemblies. The set of mounting assemblies comprises a first mounting assembly associated with the first end of the elongate trough, and a second mounting assembly associated with the second end of the elongate trough.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to an apparatus designed for efficient and versatile debris collection from surfaces. The apparatus comprises an elongate trough characterized by an open channel cross-sectional shape, equipped with a set of mounting assemblies situated at its ends for secure attachment to surface edges. Each mounting assembly features a unique clamping mechanism, driven by a rotatable drive screw and a sliding jaw, ensuring stable and reliable fixation. The apparatus may include the integration of a hatchway within its endcaps, providing convenient access to the elongate trough for depositing or removing debris during collection activities. The apparatus may include extensible members that can be adjusted between collapsed and extended positions, facilitating adaptable usage across varying debris collection scenarios.

The debris containment apparatus described herein may find use as a multi-purpose item for the purpose of helping to collect toys, foods, and/or other items which may fall off a table, desk, or workbench, etc. Depending on the designated purpose and intended use, the apparatus may comprise a trough made of either cloth or plastic, that can be removably attached to an edge of the table, desk, or workbench using a series of two or more screw clamps. The apparatus can be easily attached to and/or removed from the surface edge by loosening or tightening the clamps. The apparatus can be laterally expanded, via either a corrugated extensible bellows, or a nested series of telescoping slidable troughs. The apparatus may be designed to be dishwasher safe for easy cleaning.

According to some embodiments, they debris containment apparatus is lightweight and telescoping, designed to hold up to 15 pounds. The apparatus may easily attach to home dining tables, desks, coffee tables and kids' play tables, and is designed to catch small toys, figurines, colors, markers, snacks, and other items that may fall from a surface top. In its collapsed state, the apparatus is easily transportable, being small enough to fit into a purse, tote, or diaper bag. In some embodiments, multiple apparatuses may be chained together to a unitary trough of greater lengths.

According to some embodiments, the debris containment apparatus may be designed to hold amounts of debris of greater than 25 pounds. The apparatus may comprise a sturdier plastic or metal material, and is extendable by way of the telescoping or bellows mechanisms described herein. the product may find use in workshops, kitchens, medical care facilities, and other locations for the purpose of collecting or holding tools, equipment, and other paraphernalia.

Figure 1A:
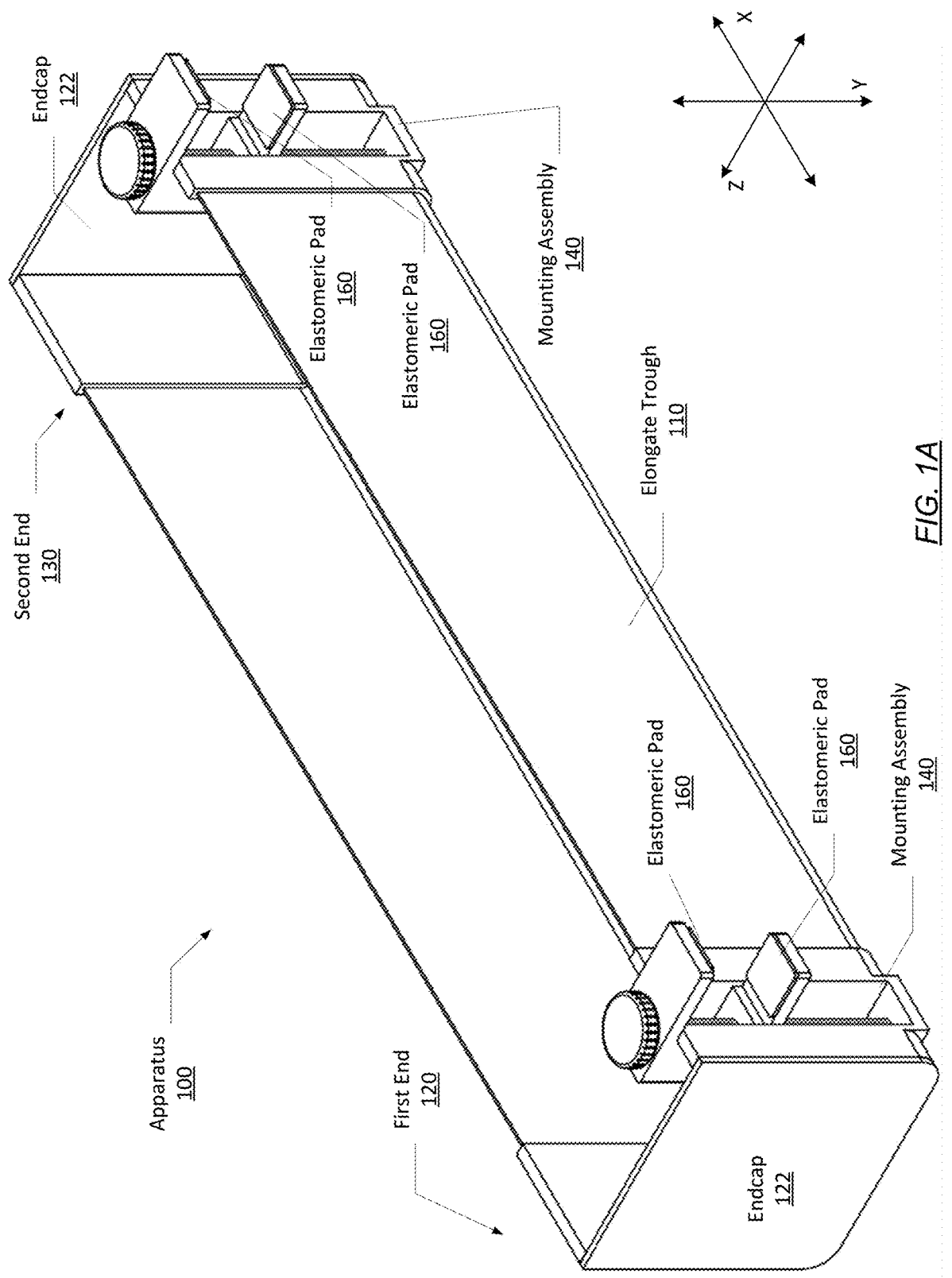
FIGS. 1A and 1B is a debris containment apparatus shown according to illustrative embodiments.
Figure 1B:
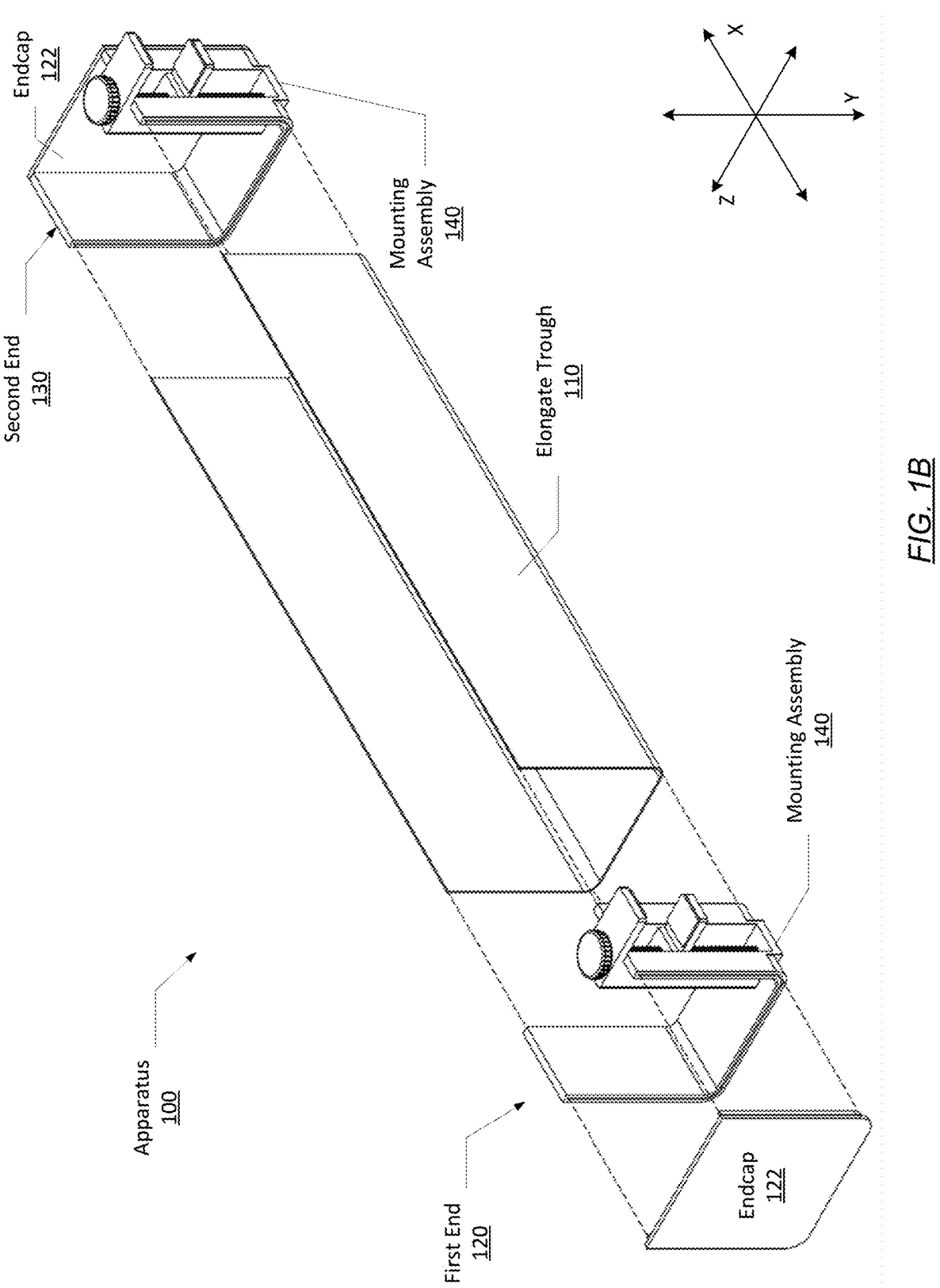

Turning to FIGS. 1A and 1B, a debris containment apparatus (100) is showing according to illustrative embodiments. The apparatus (100) comprises an elongate trough (110) having a one or more endcap (122), and one or more mounting assembly (140).

The elongate trough (110) is designed for the purpose of collecting debris dislodged from a surface. The elongate trough (110) is characterized by its elongated and channel-like shape, featuring a continuous, open pathway along its length. The primary function of the elongate trough (110) is to channel and contain debris effectively, reducing or preventing dispersion of debris and facilitating convenient removal from the collection site.

The elongate trough (110) has a cross-sectional shape of an open channel. As used herein, an "open channel" cross-sectional shape is defined as a deep hollow surface having a top that is open to the atmosphere, providing access to an interior of the elongate trough (110). The first cross-sectional shape can be selected from shapes such as trapezoidal, triangular, rectangular, wide flat, and circular (arcuate), as well as other suitable cross-sectional shapes.

The elongate trough (110) typically comprises a first end (120) and a second end (130), which is situated distal to the first end (120). Both the first end (120) and the second end (130) may have an endcap (122) associated therewith.

As used herein, an "endcap" refers to a component designed to serve as a covering or closure for one end of an elongate trough (110) or similar apparatus (100). The endcap (122) completes the elongate trough (110), effectively sealing one extremity to prevent debris from escaping the elongate trough (110) and to facilitate smooth debris collection and removal.

In some embodiments, the endcap (122) may be integrally formed with the elongate trough (110). In other embodiments, the endcap (122) may take on a shape that precisely matches the cross-sectional profile of the elongate trough (110), ensuring a seamless and snug fit. For example, if the elongate trough (110) features a channel-like cross-sectional shape, the endcap (122) may exhibit a complementary form, precisely conforming to the contours of the trough's open channel end to eliminate unwanted gaps or openings at the a first end (120) and a second end (130), maintaining an effective barrier against debris spillage.

In some embodiments, the endcap (122) can be fabricated from a variety of materials, such as plastic, metal, or rubber. The endcap (122) can be adapted to suit various operational requirements, ensuring compatibility with different trough materials and their corresponding mechanical characteristics. For example, the endcap (122) may be composed of a durable and weather-resistant polymer material, such as those materials that comprise the elongated trough. The use of a polymer-based endcap (122) further contributes to the overall lightweight design of the apparatus (100), facilitating convenient installation and handling during maintenance.

Furthermore, seamless integration of the endcap (122) into the structure of the elongate trough (110) enhances the overall aesthetics of the apparatus (100). By creating a visually cohesive and unified appearance, the endcap (122) contributes to a professional and polished finish, adding value to the apparatus (100).

The apparatus (100) includes one or more mounting assembly (140). As used herein, a "mounting assembly" is defined as a specialized mechanical configuration meticulously engineered to securely affix an elongate trough (110) or analogous apparatus (100) to a designated surface. The mounting assembly (140) serves as a crucial interface between the apparatus (100) and its intended substrate, facilitating stable attachment and optimal performance during debris collection operations.

The mounting assembly (140) are attachment mechanisms suitable for attachment of the apparatus (100) along the edge of a surface, depending on desired applications. The exact number of mounting assembl(ies) (140) can vary according to the application, but typically includes at least two—one mounting assembly (140) for each end of the elongate trough (110). The mounting assembly (140) can be clamping-type attachment mechanisms, such as a screw clamp, C-clamp, plate hemisphere clamp, ring clamp, bracket (e.g., snap-flat-, or U-bracket), band (e.g., elastic band), interlock, and/or clip. In other embodiments, the mounting assembly (140) can be selected can be, or can incorporate, any number of adapters that facilitate attachment of the apparatus along the surface edge, including but not limited to, bolts (e.g., U-bolts), snaps, nails, rivets, staples, cable holders (including, for example, self-closing, press-in, snap-lock, locking-arm, adjustable-strap, adjustable-loop, fold-over strap, flexible-loop, and adjustable-strap cable holders), straps, ties (e.g., zip-ties), tape (e.g., double-sided foam tape), hook-and-loop, clamps (e.g., bar clamps, band clamps, corner clamps, plier clamps, spring clamps, and tube clamps), tool holders, hinges, suction cups, tongs, pliers, grippers, hangars, and collars.

The technical design of the mounting assembly (140) may encompass a diverse range of configurations, each tailored to suit specific operational requirements. For example, a mounting assembly (140) may comprise a threaded screw clamp, comprising a threaded rod or screw that can be tightened or loosened by rotational motion. A screw clamp may be advantageous where a secure and adjustable grip on the surface is necessary, drawing the clamp's jaws closer together and firmly securing the elongate trough (110) in place.

In some embodiments, the mounting assembly (140) may provide customizable levels of clamping force. By adjusting the tightening mechanism of the mounting assembly (140), such as the threaded screw clamp or the handles of the C-clamp or spring clamp, operators can tailor the clamping force to suit the specific requirements of the debris collection task. This flexibility ensures that the elongate trough (110) remains firmly secured without causing damage to the surface or impeding the functionality of the apparatus (100).

In some embodiments, the mounting assembly (140) may comprise a C-clamp, which consists of a stationary jaw and a movable jaw connected by a pivoting mechanism. By tightening the clamp's handle, the movable jaw moves towards the stationary jaw, gripping the surface and locking the elongate trough (110) in position. This design offers ease of use and rapid installation, making it suitable for applications where swift attachment and removal are desired.

The C-clamp may present a quick and straightforward attachment method through its pivoting mechanism and handles. The C-clamp may be well-suited for rapid installation and repositioning, suitable for applications that require frequent adjustments or temporary setups.

In some embodiments, the mounting assembly (140) may comprise a spring that utilizes a spring-loaded mechanism to exert pressure on the surface. When the handles of the spring clamp are squeezed together, the spring compresses, causing the jaws to close and create a secure hold on the substrate. The spring clamp may be preferred in instances where repeated adjustments or frequent repositioning of the elongate trough (110) is anticipated.

In its role within the apparatus (100), the mounting assembly (140) ensures the stability and operational effectiveness of the elongate trough (110). When combined with the elongate trough (110), the mounting assembly (140) secures the apparatus (100) firmly to the surface, preventing unintended displacement during debris collection. For instance, in scenarios where the trough is positioned along the edge of a table or desk, the mounting assembly (140) ensures that the apparatus (100) remains steadfast and functional, efficiently channeling and collecting debris dislodged from the surface.

Furthermore, the compatibility of mounting assembly (140) with a variety of elongate trough (110) sizes and shapes contributes to their versatility. Whether the elongate trough (110) has a wide, open channel design or a more intricate cross-sectional profile, the mounting assembly (140) can be adapted to securely accommodate the unique characteristics of the apparatus (100).

In some embodiments, the apparatus (100) introduces a crucial enhancement to the mounting assemblies by incorporating elastomeric pad (160) s affixed to the jaws of each mounting assembly (140) within the set. This design innovation provides several key advantages that contribute to the overall functionality, stability, and adaptability of the apparatus (100) during debris collection operations.

The inclusion of elastomeric pad (160) s represents a strategic refinement that addresses potential challenges associated with surface compatibility, clamping force distribution, and prevention of surface damage. These pads, typically composed of a resilient and flexible elastomeric material, offer a cushioned interface between the jaws of the mounting assemblies and the surface to which the elongate trough (110) is affixed. This cushioning effect serves to protect both the attachment surface and the elongate trough (110) itself, minimizing the risk of abrasion, indentation, or other forms of surface damage that may occur during the attachment process.

By acting as a protective buffer, the elastomeric pad (160) s mitigate concerns related to surface irregularities or variations. Irregular surfaces, such as textured pavements or uneven ground, may pose challenges for achieving uniform clamping force and secure attachment with traditional mounting assemblies alone. The elastomeric pad (160) s adapt to these irregularities, ensuring consistent and reliable attachment by conforming to the surface contours and distributing the clamping force more evenly.

Additionally, the elastomeric pad (160) may contribute to the overall stability of the attachment. The inherent elasticity of elastomeric pad (160) may allow elastomeric pad (160) to absorb vibrations, shocks, and minor movements that may arise from external forces or environmental factors. This absorption capability helps maintain the secure attachment of the elongate trough (110), preventing unintended displacement even in dynamic or unpredictable conditions.

Figure 2:
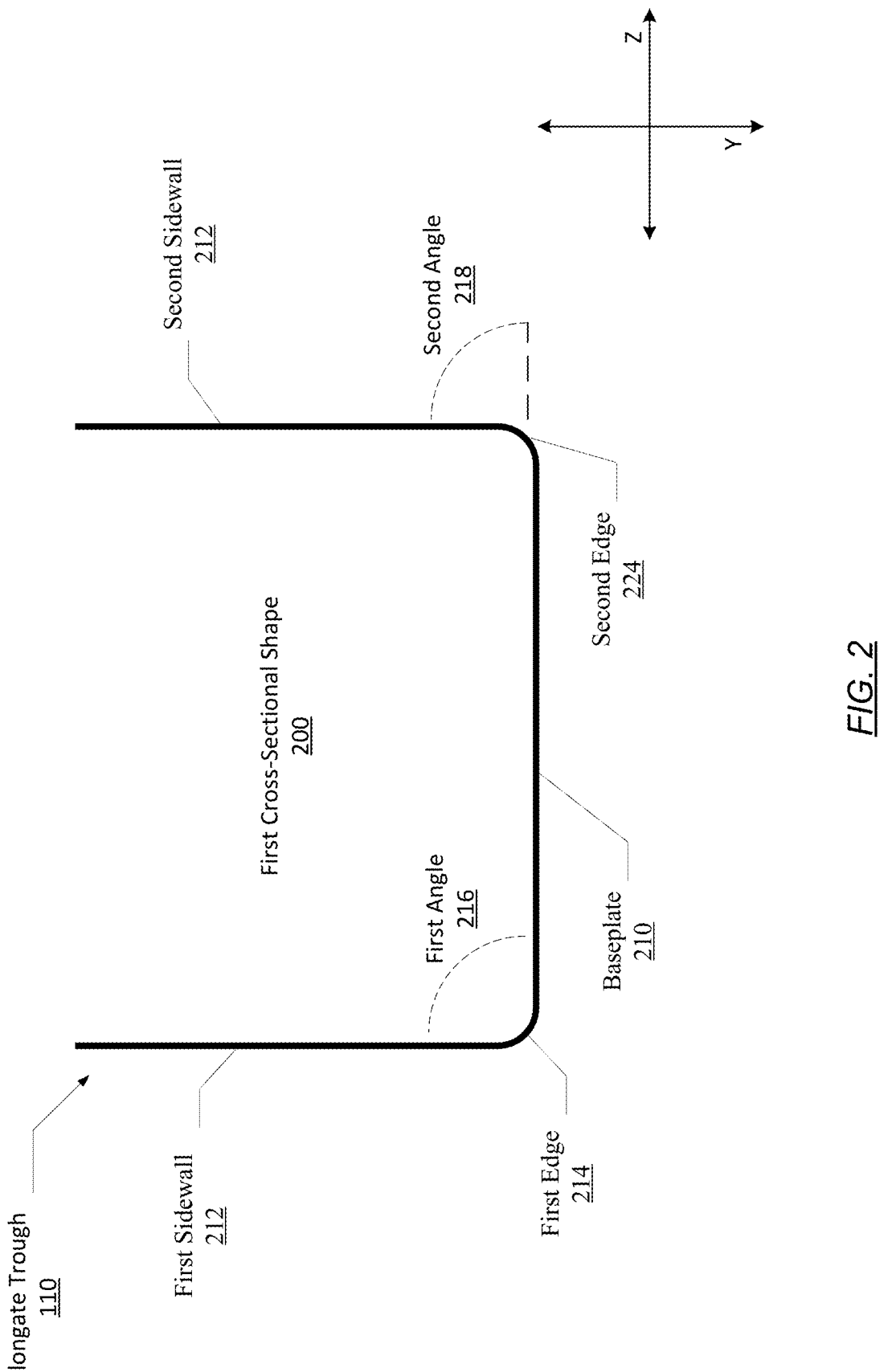
FIG. 2 is a cross section of an elongate through shown according to illustrative embodiments.

Referring to FIG. 2, a cross section of the elongate through (110) taken in the Y-Z plane is shown according to illustrative embodiments. As shown, the elongate through (110) comprises a baseplate (210), first sidewall (212), and second sidewall (222)

In some embodiments, the apparatus (100) presents configuration that optimizes the structural integrity, debris collection efficiency, and versatility of the elongate trough (110).

Baseplate (210) provides a foundation of the elongate trough (110) that extends between the first end (120) and the second end (130). This baseplate (210) serves as a stable platform upon which the apparatus (100) is built. The baseplate (210) offers a solid substrate for mounting the apparatus (100), and contributes to load distribution, evenly dispersing forces and minimizing stress concentrations that could potentially compromise the structural integrity of the elongate trough (110).

Extending from the baseplate (210), the first sidewall (212) and second sidewall (222) help to define its geometric profile. These sidewalls to channel and contain debris dislodged from surfaces, preventing scatter, and facilitating debris collection. In some embodiments, specific angles formed between the first sidewall (212), second sidewall (222), and baseplate (210) may impact the effectiveness of the apparatus (100) in guiding debris towards the trough and optimizing the volume of collected debris.

The first sidewall (212) extends along the first edge (214) of the baseplate (210), forming a first angle (216) that complements the baseplate (210)'s orientation. This angle may facilitate the deflection and funneling of debris towards the elongate trough (110). As debris is dislodged from surfaces, the first sidewall (212) guides debris along a trajectory that ensures maximum capture within the trough, minimizing the likelihood of escape or dispersion. Thus, first angle (216) ay be selected to enhances a capacity of apparatus (100) to efficiently gather debris from various surfaces.

The second sidewall (222) extends along the second edge (224) of the baseplate (210), forming the second angle opened (218). in some embodiments, second angle (218) is supplementary to the first angle (216). This symmetrical arrangement may facilitate balanced and consistent debris containment, promoting uniform collection across the entire length of the elongate trough (110). The second sidewall (222) complements the guidance provided by the first sidewall (212), facilitating the cohesive collection of debris in the apparatus (100).

In some embodiments, the first side wall (212) and/or second side wall (214) may have an upper edge that is recessed below a static jaw of the mounting assembly (140). in other words, an upper edge of the first side wall (212) and/or second side wall (214) may be disposed below, or "dip" beneath, a horizontal level defined by these static jaws of the mounting assemblies (140). In some embodiments, an upper edge of the first side wall (212) and/or second side wall (214) that is recessed below a static jaw of the mounting assembly (140) may improve debris collection when a gap is present between the apparatus (100) and the surface to which the apparatus (100) is mounted.

Figure 3:
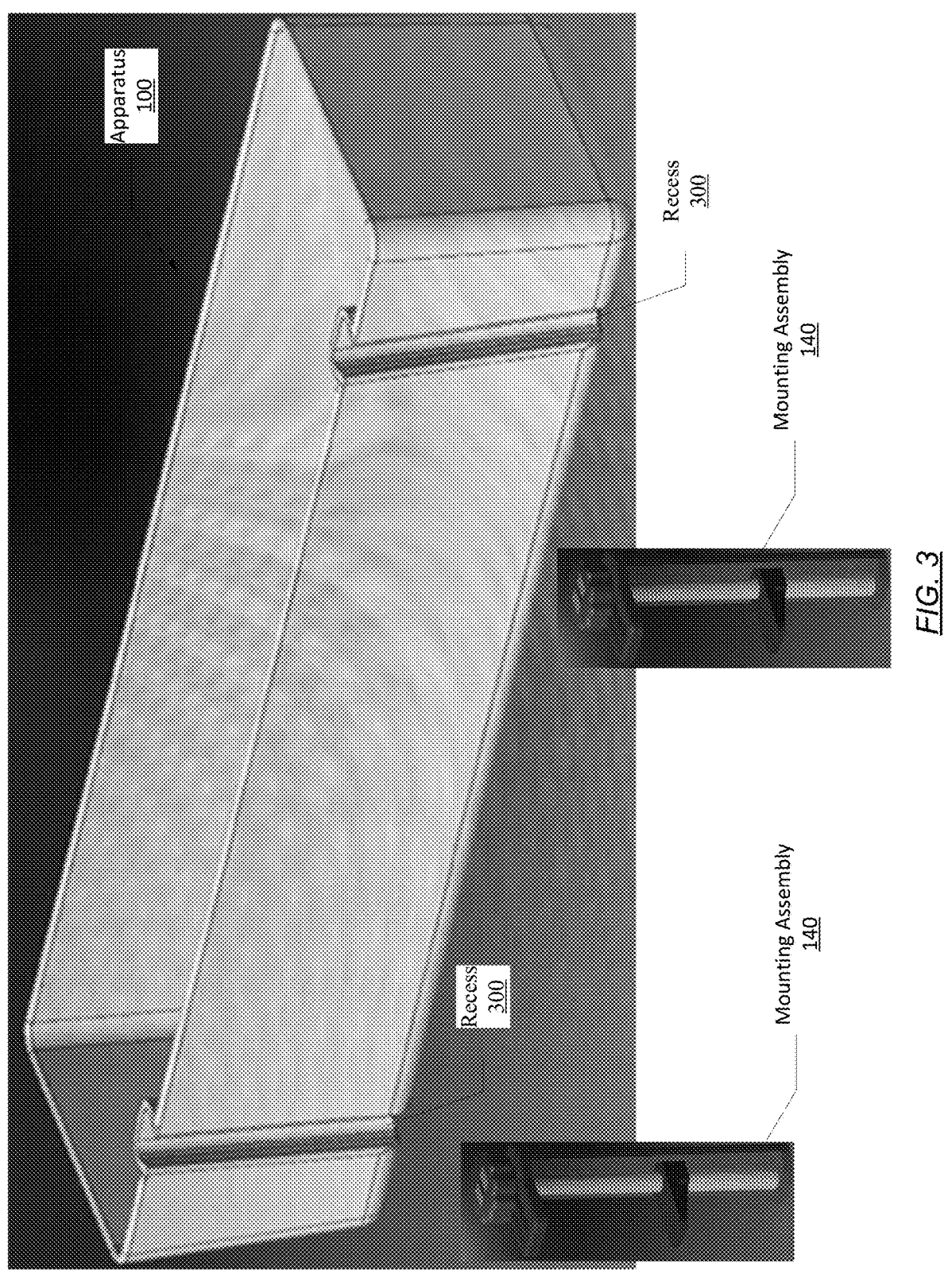
FIG. 3 is debris collection apparatuses shown according to illustrative embodiments.

Referring now to FIG. 3, debris collection apparatuses is shown according to illustrative embodiments. The apparatus of FIG. 3 is one example of apparatus (100) of FIG. 1.

In some embodiments, the apparatus (100) features a streamlined and efficient attachment mechanism achieved through the integration of a set of mounting assemblies (140). The mounting assemblies (140) may be designed to be snap-fit into a set of recess(es) (300) molded into the outer surface of the elongate trough (110).

Snap-fitting the mounting assemblies (140) into recess(es) (300) may provide a secure and easily adjustable means of attaching the elongate trough (110) to the intended surface. Snap-fitting capitalizes on the inherent flexibility of certain materials used in the apparatus (100), allowing the mounting assemblies to be effortlessly engaged with the recess(es) (300). Snap-fitting ensures a firm and stable connection between the mounting assemblies and the elongate trough (110), mitigating the risk of unintentional detachment during debris collection activities.

The recess(es) (300) incorporated in the outer surface of the elongate trough (110) may streamline the attachment process and contribute to the overall sleek and unobtrusive appearance of the apparatus (100). By housing the mounting assemblies (140) within the recess(es) (300), the risk of protruding or obtrusive elements is minimized, maintaining a clean aesthetic that is both visually appealing and safety conscious.

Furthermore, the snap-fit configuration may enhance the ease of assembly and disassembly of the apparatus (100). This feature proves advantageous when the elongate trough (110) requires repositioning, maintenance, or storage. With a snap-fit mechanism, the user can swiftly attach or detach the mounting assemblies (140) without the need for specialized tools or complex procedures. This user-friendly approach saves valuable time and effort, promoting efficient operation and adaptability across various environments.

Additionally, the snap-fit arrangement minimizes potential damage to the elongate trough (110)'s outer surface during the attachment process. Traditional attachment methods, such as screws or clamps, may involve drilling or compressive force that could mar the surface or compromise its structural integrity. In contrast, the snap-fit design reduces the risk of surface damage, preserving the appearance and extending the service life of the apparatus (100).

Figure 4:
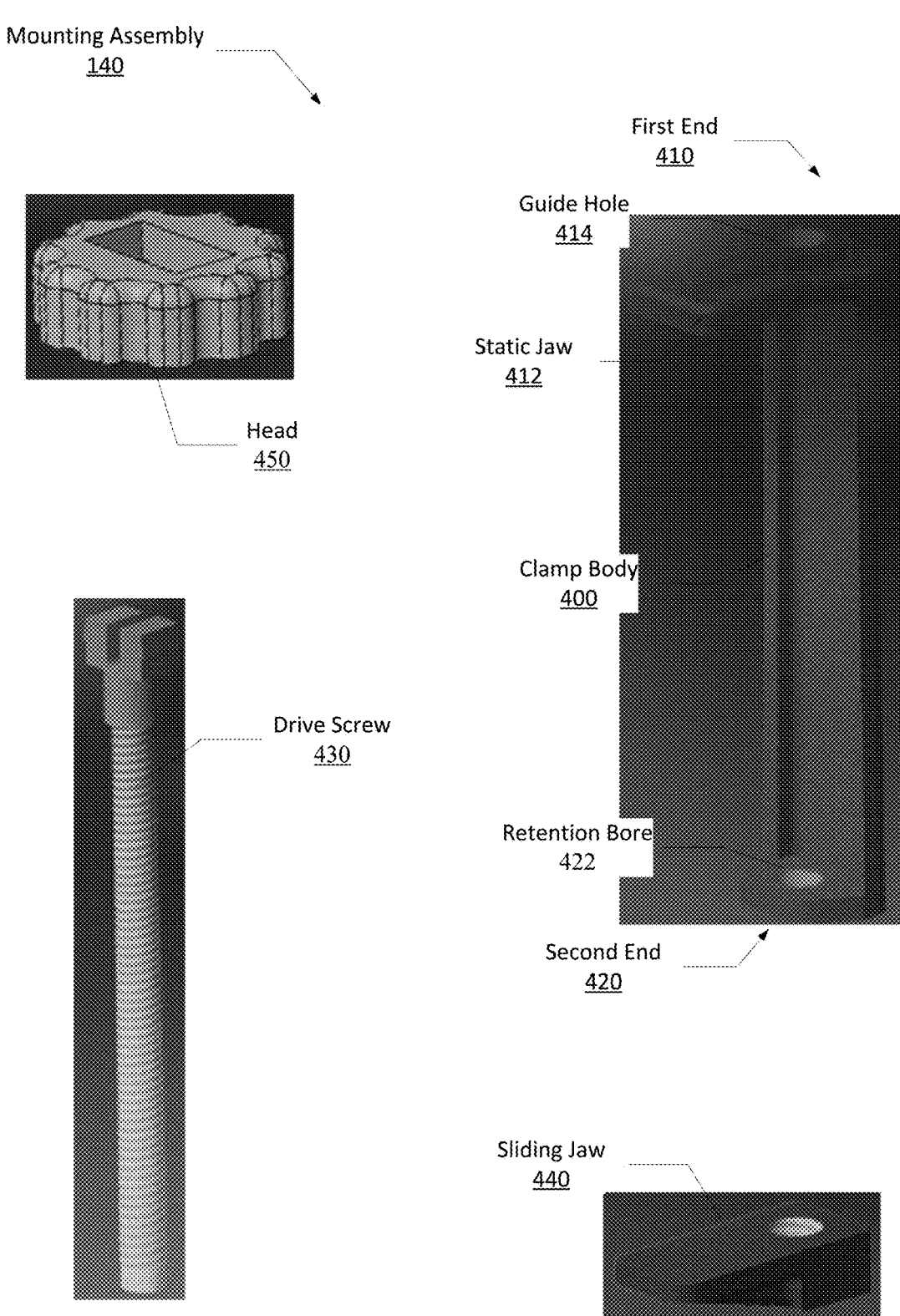
FIG. 4 is an exploded view of a mounting assembly shown according to illustrative embodiments.

Referring now to FIG. 4, an exploded view of a mounting assembly is shown according to illustrative embodiments. The various components illustrated in FIG. 4 can be implemented in a mounting assembly, such as the mounting assembly (140) shown in FIGS. 1-3 as illustrated, the mounting assembly (140) includes a clamp body (400).

Each clamp body (400) comprises various components that collectively optimize attachment reliability, adjustability, and operational efficiency of the mounting assembly (140).

The clamp body (400) includes a first end (410) having a static jaw (412). This static jaw (412) provides a stable foundation against which the attachment surface is secured, ensuring a firm base for subsequent clamping operations.

Continuing along the clamp body (400), the first end (410) also includes a guide hole (414). The guide hole (414) serves as a conduit for controlled movement of screw (300), facilitating the engagement and disengagement of the apparatus (100).

The second end (420) of the clamp body (400) is located distal to the first end (410), and includes a retention bore (422). The retention bore (422) is axially aligned with the guide hole (414), plays a crucial role in stabilizing and anchoring the assembly. The retention bore (422) acts as a secure channel through which dynamic elements can move, ensuring consistent alignment and optimal interaction between components.

A drive screw (430) is positioned within the guide hole and retention bore. The drive screw (430) is freely rotatable within the guide hole and retention, providing users with intuitive control over the clamping force. This adjustability may be advantageous when adapting the apparatus (100) to different surface types, ensuring optimal attachment, and preventing excessive force that could potentially damage delicate surfaces.

The sliding jaw (440) is threadably coupled onto the drive screw (430). This threaded coupling allows rotational movement of the drive screw (430) to effectuate linear motion of the sliding jaw (440). As the drive screw (430) is rotated, the sliding jaw moves along the clamp body (440), enabling the assembly to adapt to various attachment surfaces. By rotating the drive screw (430), users can conveniently adjust the degree of pressure exerted by the assembly's sliding jaw onto the attachment surface. This threaded coupling also reinforces the assembly's adjustability, as users can finely tune the clamping force according to the specific demands of each debris collection scenario.

In some embodiments, a head (450) can be integrated onto the drive screw (430) to enable precise linear motion of the sliding jaw (440). Head (450) may enhance the clamping functionality of mounting assembly (140) by providing users with intuitive control over the attachment process while optimizing stability and ease of use.

The head (450) may be attached directly into the first end (430), and positioned in close proximity to the first end (410) of the clamp body (400). The head (450) serves to transform rotational motion into linear movement, enabling the controlled advancement of sliding jaw (440) along the length of the drive screw (430). As users rotate the head (450), the drive screw (430) responds by translating the rotational input into a linear displacement of the sliding jaw (440), effectively increasing, or decreasing the clamping force exerted onto an attachment surface.

Furthermore, the integrated head (450) may minimize the likelihood of misalignment or unintended adjustments during the attachment process. The placement of the head (450) proximate to the first end (410) of the clamp body (400) reduces the potential for interference or lateral displacement, facilitating a smooth and consistent linear movement of the sliding jaw (440) along the drive screw (430).

Figure 5A:
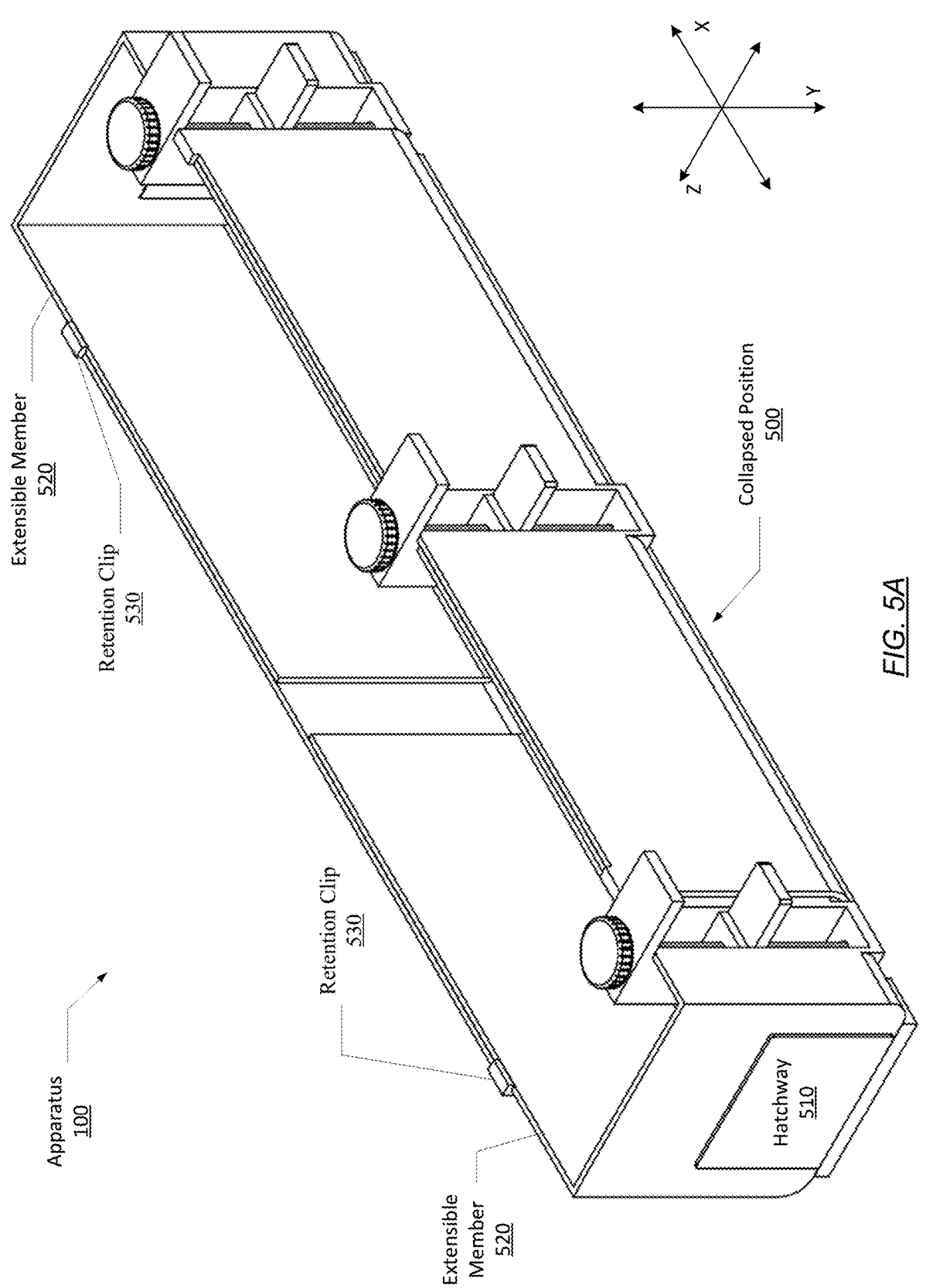
FIG. 5A is a debris containment apparatus shown in a collapsed position according to illustrative embodiments.
Figure 5B:
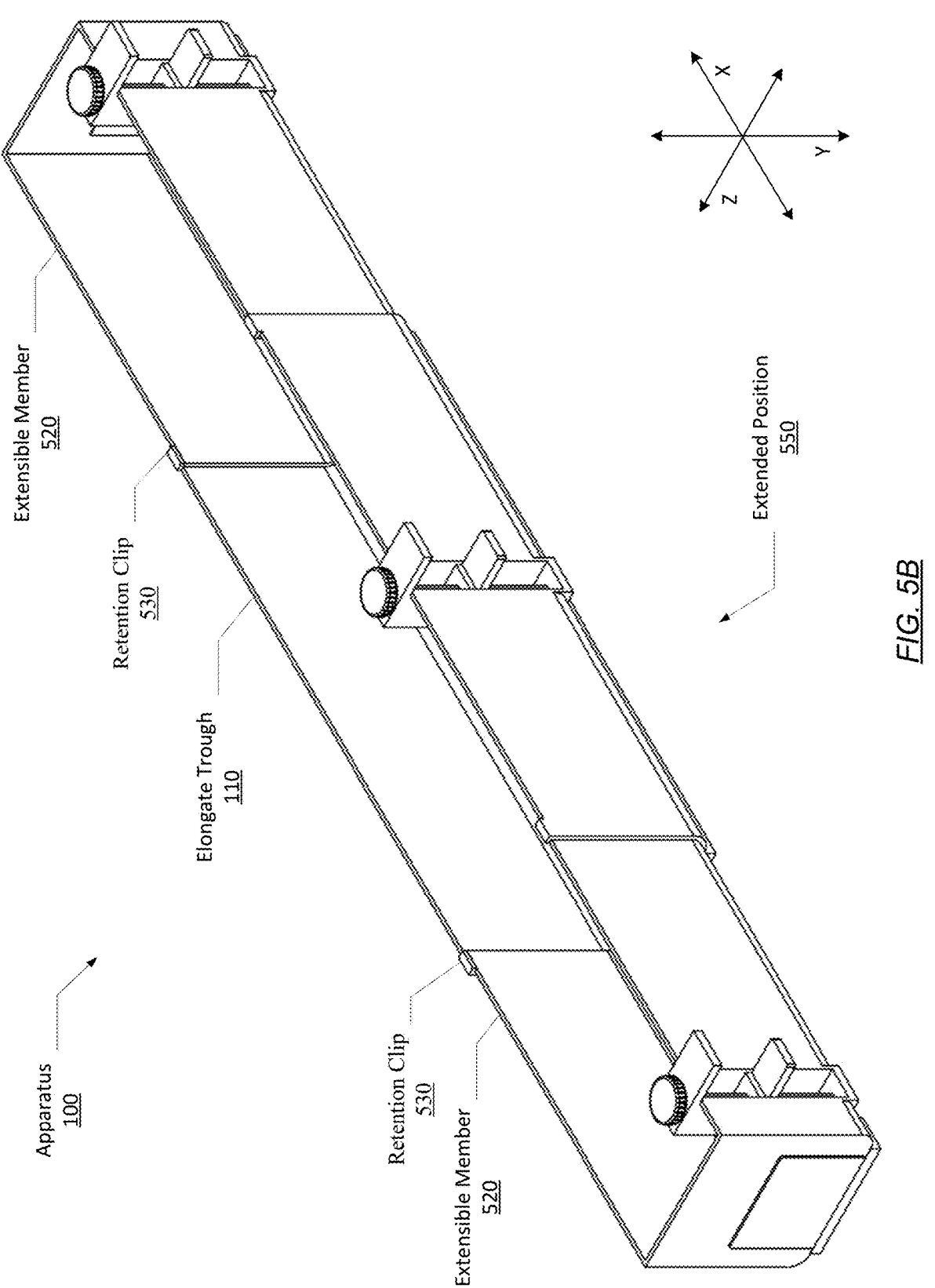
FIG. 5B is a debris containment apparatus shown in an extended position according to illustrative embodiments.

Referring now to FIGS. 5A and 5B, the apparatus (100) is shown in a collapsed position (500) and extended position (550) according to illustrative embodiments.

In some embodiments, the patent claim introduces an intriguing enhancement to the apparatus, expanding its capabilities and versatility through the inclusion of a hatchway (510). The hatchway (510) is incorporated into one or more of the endcap (122).

The primary purpose of the hatchway (510) is to facilitate access to the interior of the elongate trough when the apparatus is in use for debris collection. By forming a hatchway (510) within the endcap (122), users can conveniently remove collected debris from the elongate trough (110) without the need to disassemble or detach the entire apparatus from its positioned edge. This streamlined process may contributes to a more efficient and user-friendly debris collection experience.

Placement of the hatchway (510) within either the endcap (122) offers flexibility to users based on their specific operational preferences or requirements. For example, if the apparatus (100) is positioned along a surface edge where one end is more accessible than the other, users have the freedom to select the optimal endcap (122) for the hatchway (510). This design approach aligns with the adaptable nature of the apparatus (100), catering to diverse scenarios and user preferences.

The hatchway (510) may eliminate the need for frequent detachment or disassembly of the apparatus during debris collection activities. Users can simply open the hatchway (510) to remove debris, which can be particularly beneficial when dealing with frequent or voluminous debris dislodgement. This streamlined process minimizes disruption and downtime, enabling more efficient and continuous debris collection operations.

Additionally, the hatchway (510) may enhance safety and operational comfort. Users can avoid reaching into the elongate trough or managing the apparatus to remove debris, reducing the risk of injury or discomfort.

In some embodiments, the apparatus (100) may include at least one extensible member (520) associated with either the first end (120) or the second end (130) of the elongate trough (110). This extensible member (520) enables expanding of the apparatus (100), offering users the ability to tailor the apparatus (100) to different operational needs and environments. For example, the extensible member (520) may comprise a pleated bellows.

According to the embodiments, the extensible member (520) is configured to extend from either or both of the first and second ends of the elongate trough (110). In one or more embodiments, the extensible member (520) may be telescopically nested in the elongate trough (110). More specifically, the elongate trough (110) and the extensible member (520) may be aligned relative to each other and be slidingly engaged.

According to the embodiments, the extensible member (520) has a second cross sectional shape that is geometrically similar to the first cross-sectional shape of the elongate trough (110). As used herein, the term "geometrically similar" means that two geometric shapes have proportional side lengths and identical angles. In other words, two shapes will approximately overlap when scaled up or down (together with a translation, rotation, or reflection).

The extensible member (520) introduces an element of adjustability that increases the reach and coverage of the elongate trough (110). As illustrated further in FIG. 6, the extensible member (520) may possess a second cross-sectional shape (600) that is geometrically akin to the original first cross-sectional shape (200) of the elongate trough (110). This geometric similarity ensures a seamless integration between the elongate trough (110) and the extensible member (520), promoting uniformity in the design and functionality of the apparatus (100).

Recess(es) can be molded into in the outer surface of the extensible member (520), enabling mounting assemblies (140) to be snap-fit into the extensible member (520) Similar to the recesses recess(es) (300) of FIG. 3, recess(es) molded into in extensible member (520) are designed to accommodate the mounting assemblies with a snug and precise fit.

The extensible member (520) is designed to be adjustably configurable between a collapsed position (500) and an extended position (550). This dynamic configuration offers users the freedom to adapt the apparatus (100) according to the specific requirements of different debris collection scenarios. When collapsed as shown in FIG. 5A, the extensible member (520) retracts to a compact form, ensuring easy storage, transportation, and maneuverability.

Conversely, extending the extensible member (520) as illustrated in FIG. 5B, enables the apparatus (100) to cover a larger area during debris collection activities. This extended position (550) enhances coverage area, enabling apparatus (100) to addressing larger surface areas.

In some embodiments, the extensible member (520) may be telescopically nested within the elongate through (110). As used herein, the term "telescopically nested" refers to a specialized arrangement wherein the at least one extensible member (520) is designed to be contained within the elongate trough (110) in a manner resembling the telescopic geometrically similar parts. This design configuration enhances the compactness, maneuverability, and efficiency of the apparatus (100), allowing it to seamlessly transition between collapsed and extended states while maintaining a streamlined and space-saving form.

The concept of telescopic nesting involves the insertion of one component within another, typically with a concentric or coaxial alignment. The at least one extensible member (520) is ingeniously engineered to fit snugly and securely within the confines of the elongate trough (110). This nesting relationship is achieved by designing the extensible member (520) to have a cross-sectional profile that is geometrically compatible with the interior dimensions of the elongate trough (110). When collapsed, the extensible member (520) is retracted into the trough, maintaining a compact and integrated form that preserves the overall dimensions of the apparatus (100).

In some embodiments, a set of retention clips (530) are integrated at the upper edge (820) of either the elongate trough (110) itself or the associated extensible member (520). The retention clips (530) facilitate a functional and secure connection between the elongate trough (110) and the extensible member (520), enabling smooth and controlled extension while preventing excessive movement beyond the designated extensible dimension when the member is in the extended position (550).

The retention clips (530) may be integrally formed with an upper edge of the extensible member (520), or with an upper edge of the elongate trough (110). The retention clips (530) may be configured to slidably engage the upper edge of the extensible member (520) or the elongate trough (110) that is non-integral. Side walls of the extensible member (520) can be positioned into an area between the retention clips (530) and sidewalls of the elongate trough (110). The area between the retention clips (530) and sidewalls of the elongate trough (110) may be slightly larger than a width of the sidewalls of the extensible member (520) to allow a proper clearance to fit. The clearance fit may be sized according to acceptable tolerance ranges, for example, characterized as loose-running, free-running, close-running or sliding.

The function of these retention clips (530) is twofold. The retention clips (530) serve as connecting elements that enable the sliding engagement between the elongate trough (110) and the extensible member (520). When the extensible member (520) is retracted or extended, the retention clips (530) guide and stabilize the movement, ensuring a controlled and secure connection between the elongate trough (110) and the extensible member (520).

Furthermore, the retention clips (530) limit the movement of the extensible member (520) to a predefined extensible dimension when it is in the extended position (550). Thus, the retention clips (530) may prevent overextension or unintended movements that could compromise the stability and integrity of the apparatus (100) during debris collection activities. By confining movement of the extensible member to a specific range, the retention clips (530) enable the apparatus (100) to maintain a consistent operational state.

Figure 6:
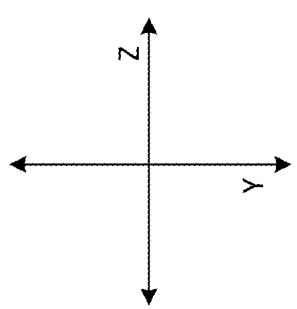
FIG. 6 is a cross section of an elongate trough and extensible member shown according to illustrative embodiments.
Figure 6:
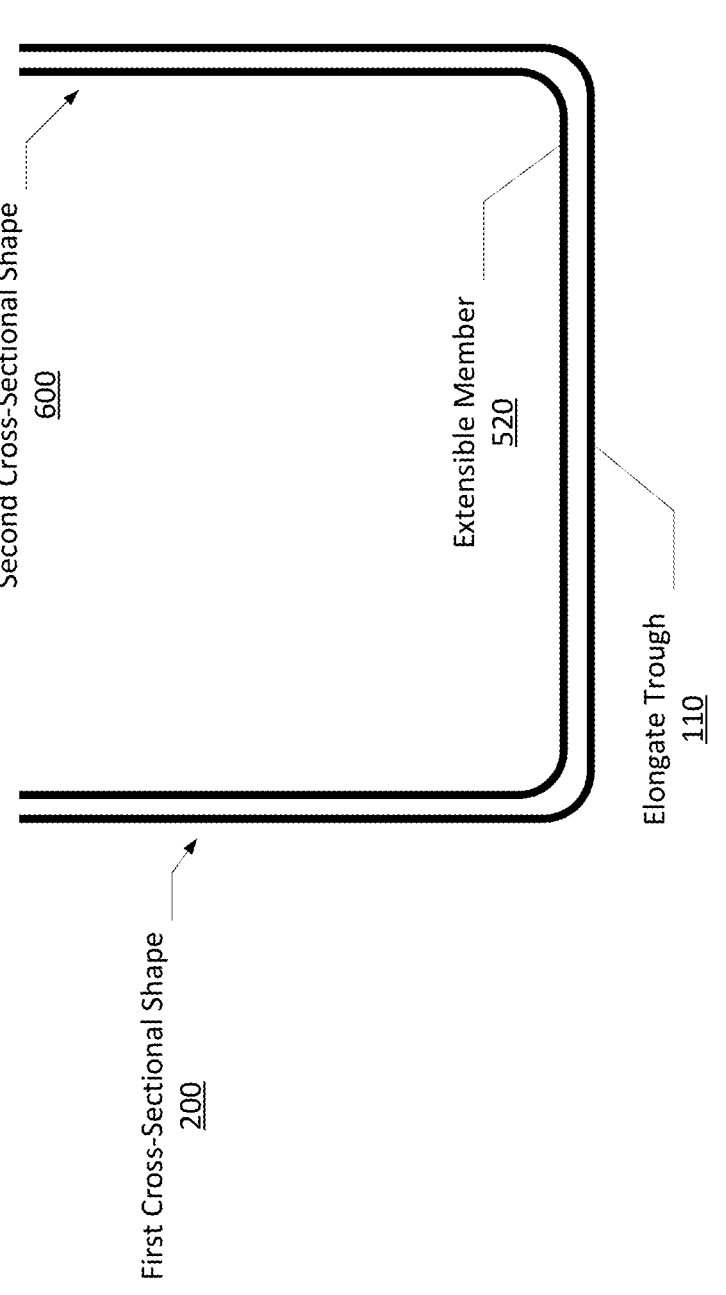

Referring now to FIG. 6, a cross section of the elongate through (110) and extensible member (520) taken in the Y-Z plane is shown according to illustrative embodiments. FIG. 6 illustrates the geometric similarity between the First cross-sectional shape (200) of the elongate trough (110) and the second cross-sectional shape (600) of the extensible member (520).

The geometric similarity between the second cross-sectional shape (520) of the extensible member (520) and the first cross-sectional shape (200) of the trough ensures seamless integration and uniform functionality. This design choice prevents any disruption to the performance of the apparatus (100) that might arise from the addition of an adjustable component. The extensible member (520)'s ability to transition between collapsed and extended positions further underscores its adaptability, allowing users to tailor the configuration of the apparatus (100) to match specific collection needs without compromising on stability or effectiveness.

This telescopically nested configuration optimizes the storage and transport capabilities of apparatus (100). When not in use, the extensible member (520) can be fully retracted into the elongate trough (110), minimizing the overall footprint of the apparatus (100), and facilitating convenient storage in confined spaces. This compact arrangement is particularly valuable for scenarios where storage space is at a premium, ensuring that the apparatus (100) can be stored alongside other equipment without consuming excess room.

Moreover, the telescopically nested design simplifies deployment and repositioning. As the apparatus (100) is readied for use, the extensible member (520) can be effortlessly extended to its desired length, effectively increasing reach of the apparatus (100). The nested configuration streamlines this extension process by eliminating the need for additional attachment or assembly steps. This intuitive operation enhances user experience and promotes rapid deployment, enabling efficient response to debris collection requirements.

The telescopically nested arrangement also contributes to the aesthetics and ergonomics of the apparatus (100). The integrated design maintains a clean and sleek exterior profile, presenting a unified and professional appearance. Additionally, the streamlined form factor enhances maneuverability of the apparatus (100), allowing the apparatus (100) to navigate tight spaces, corners, and other challenging environments with ease.

Furthermore, when extensible member (520) s are incorporated into the elongate trough (110), the endcap 122 may ensure that the extensible member (520), in its collapsed position (500), remains securely nested within the trough, preserving the integrity of the apparatus (100), and minimizing the risk of entanglement during transportation and storage.

Figure 7:
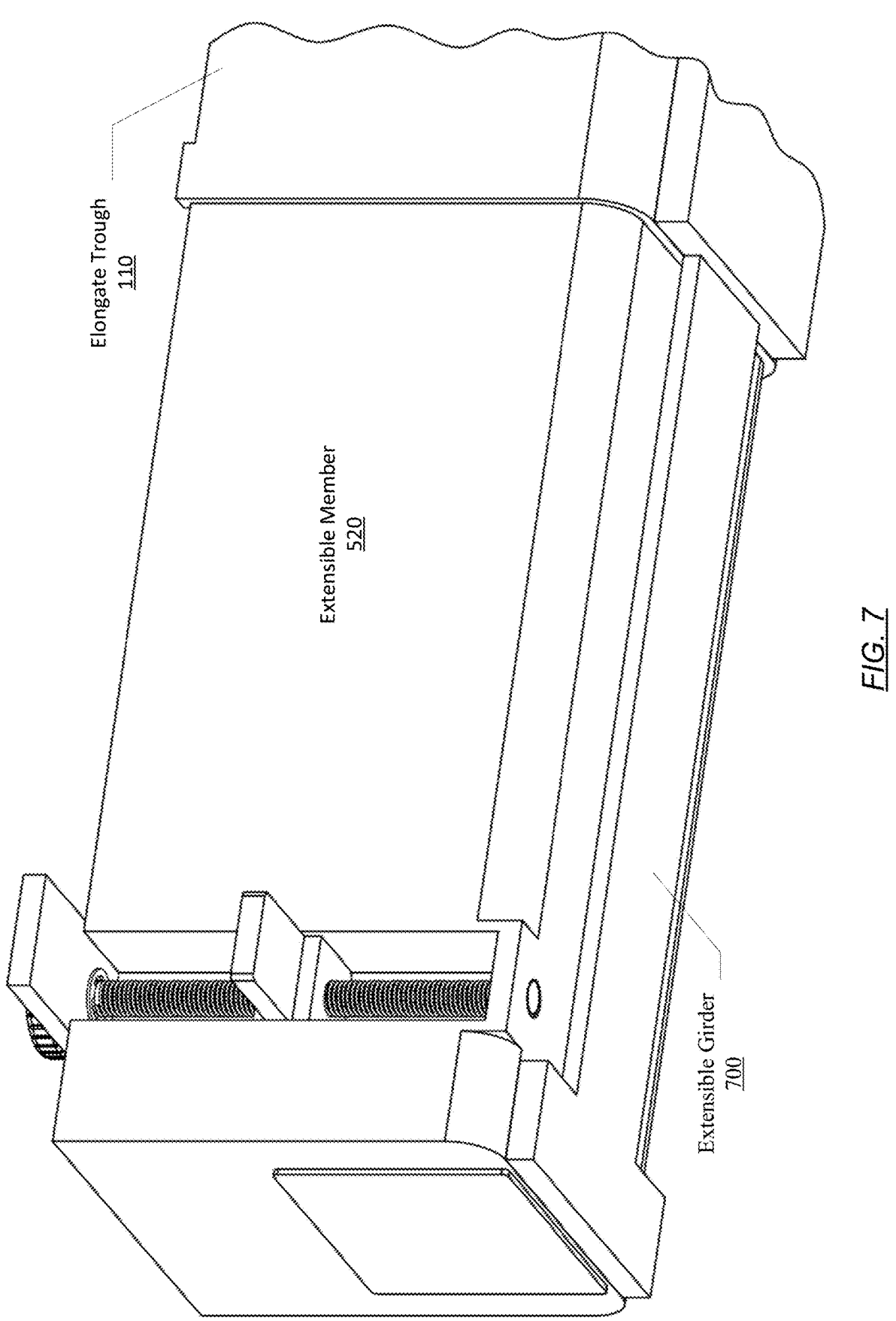
FIG. 7 is a debris containment apparatus having an extensible girder shown according to illustrative embodiments.

Referring now to FIG. 7, an apparatus having an extensible girder is shown according to illustrative embodiments. The girders are extendable/retractable in the lateral direction commensurate with the extensible members as the overall length of the apparatus is adjusted. When the extensible members or any retracted state, the girders may be contained within a housing mounted on the underside of the elongate trough. As the extensible members are extended outward, the girders slide outward from the housing coextensively with the extensible members. Once extended, the girders may reduce or eliminate undesired orientational deviations of the extensible members when in the extended state.

In some embodiments, the apparatus (100) includes at least one extensible girder (700). The extensible girder (700), when combined with its strategic attachment to the outer surface of the elongate trough (110), may enhance the structural integrity, extension, and overall versatility of the apparatus (100).

The term "extensible girder" refers to a specialized structural element that is capable of extension and retraction. The extensible girder (700) is designed to coextend with the extensible member (520), functioning seamlessly within the operational range of the apparatus (100) as it transitions between the collapsed and extended positions.

This girder (700) is incorporated into the apparatus (100) to provide additional support, reinforcement, and extension capabilities. The primary function of the extensible girder (700) is to bolster the stability and load-bearing capacity of the elongate trough (110), ensuring that the apparatus (100) can effectively withstand the forces exerted during debris collection activities.

The extensible girder (700) can be designed to coextend with the extensible member (520). As the extensible member (520) is extended to its full length, the extensible girder (700) smoothly follows suit, maintaining a parallel and synchronized movement. This coordinated extension ensures that the structural integrity of the apparatus (100) is preserved, even when reaching maximum extension.

The extensible girder (700) can be attached to the outer surface of the elongate trough (110). By securing the girder (700) to the trough's exterior, the apparatus (100) maximizes the use of available space while maintaining a streamlined form factor. This attachment configuration prevents any interference with the extensible member (520)'s movement and allows for a cohesive and integrated extension process.

Figure 8:
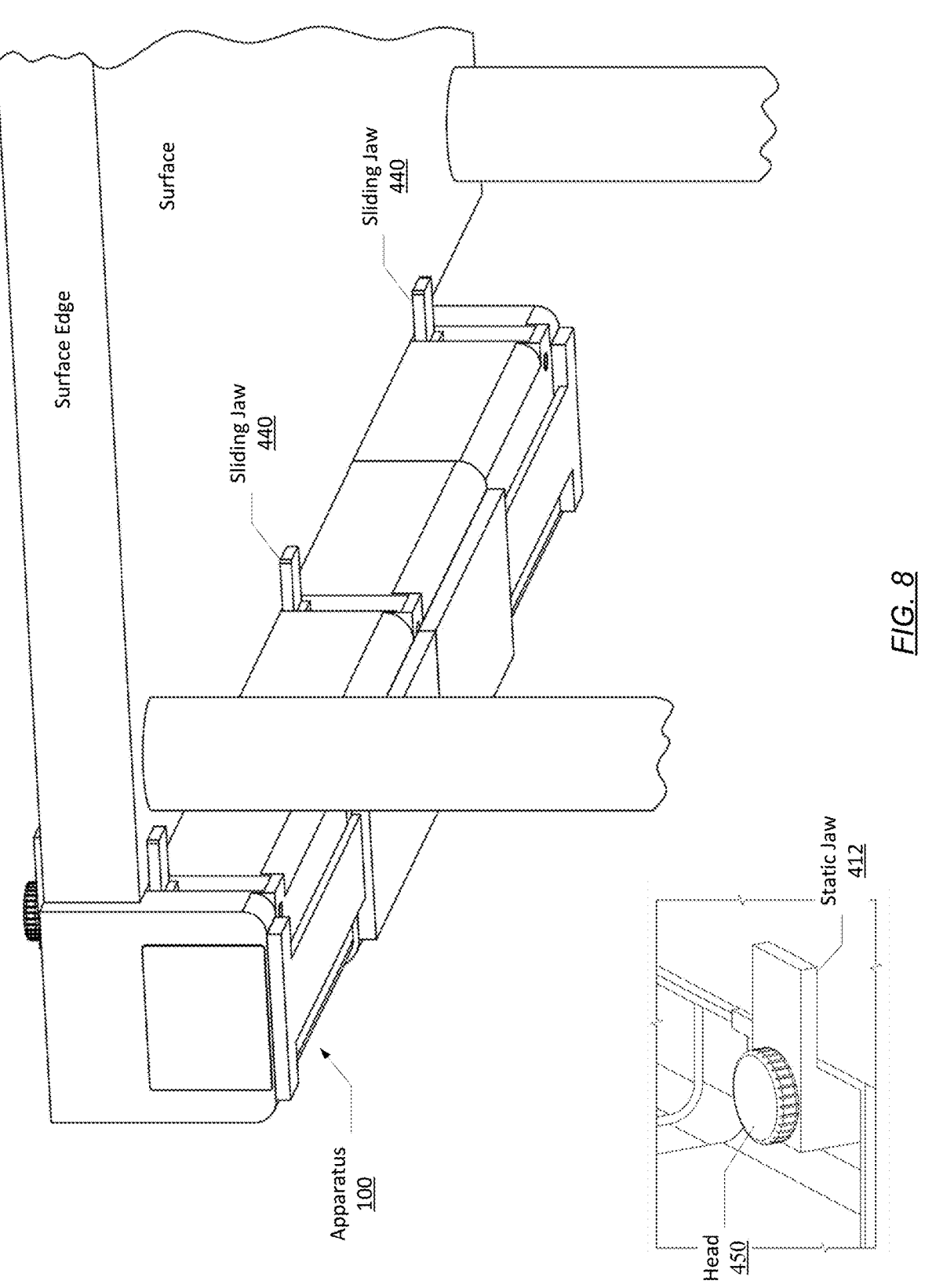
FIG. 8 is a debris collection apparatus shown attached to a surface, according to one or more illustrative embodiments.

Referring now to FIG. 8, a debris collection apparatus is shown attached to a surface, according to one or more illustrative embodiments. As described in FIGS. 3-5 supra, when the head (450) is rotated, the sliding jaw (440) moves along drive screw (430), enabling the assembly to adapt to various attachment surfaces. By rotating the head (450), users can conveniently adjust the degree of clamping pressure exerted by the assembly's sliding jaw onto the attachment surface. This adjustability is particularly advantageous when adapting the apparatus to different surface types, ensuring optimal attachment, and preventing excessive force that could potentially damage the apparatus (100).

While FIGS. 1-8 shows a configuration of components, other configurations may be used without departing from the scope of the invention. For example, various components may be combined to create a single component. As another example, the functionality performed by a single component may be performed by two or more components.

Figure 9:
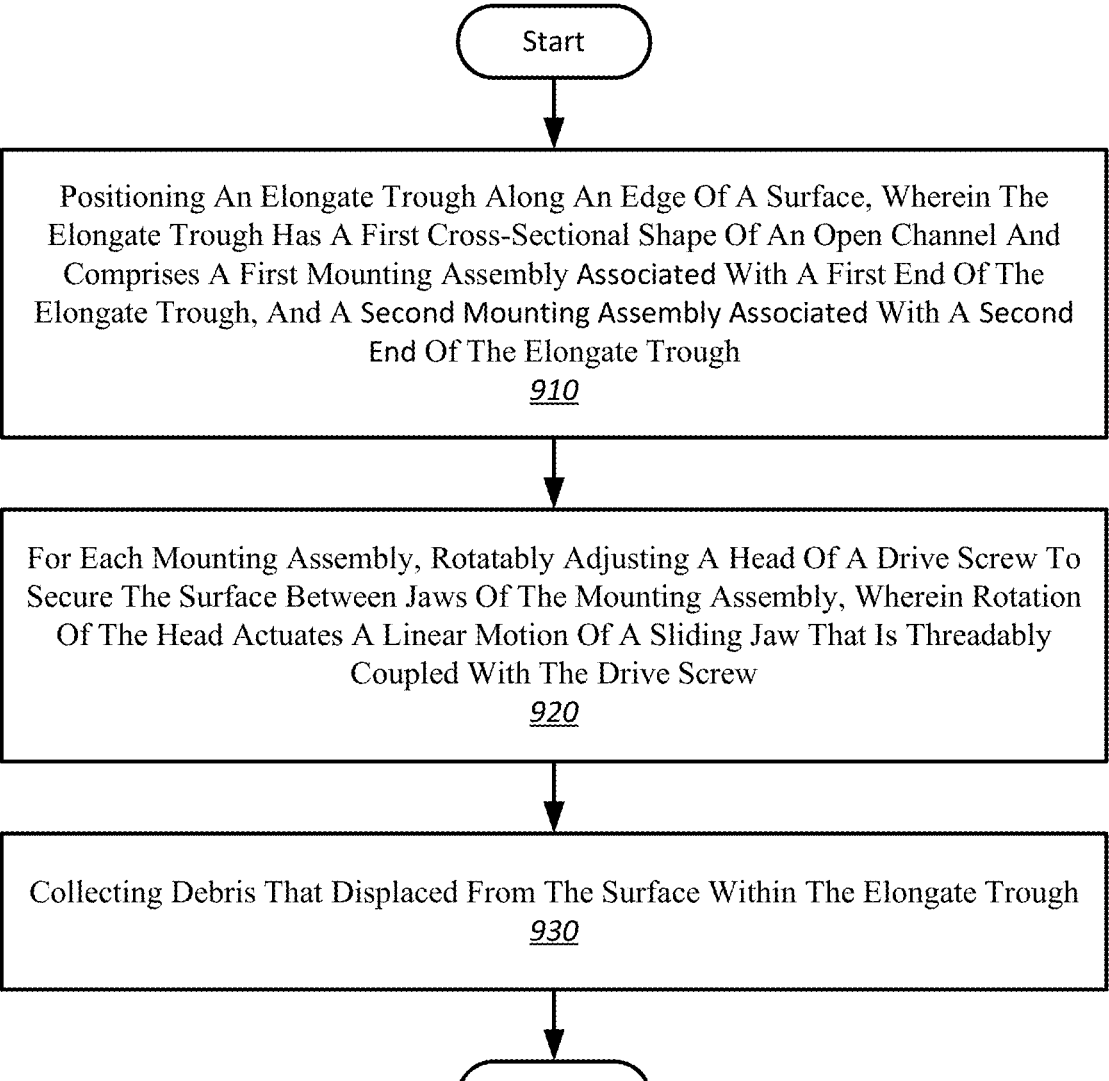
FIG. 9 is a method for collecting debris is shown according to illustrative embodiments.

Turning to FIG. 9, a method for collecting debris is shown according to illustrative embodiments. the method of FIG. 9 can be implemented apparatus (100), as shown in FIGS. 1-8.

In some embodiments, the method for collecting debris utilizing a specialized apparatus (100) that includes an elongate trough (110), mounting assemblies, first end (430) s, and sliding jaw (440) s. This method outlines a systematic process for effectively positioning the elongate trough (110) along a surface edge, securely attaching it using mounting assemblies, and subsequently collecting debris that becomes dislodged from the surface within the confines of the trough.

At step 910, the method involves the positioning of the elongate trough along the edge of a surface. The elongate trough is specially designed with a first cross-sectional shape that resembles an open channel, allowing it to efficiently capture and contain debris that may be dislodged from the surface. This arrangement provides a strategic collection area for debris, streamlining the overall cleanup process.

The elongate trough is equipped with a first mounting assembly associated with its first end, and a second mounting assembly associated with its second end. These mounting assemblies serve as the apparatus's connection points to the surface. They facilitate the secure attachment of the elongate trough to the surface edge, ensuring stability and preventing unintended movement during the debris collection procedure.

At step 920, a head of a drive screw is rotatably adjusted. This adjustment serves to fine-tune the positioning and clamping force of the mounting assembly on the surface edge. The first end's rotation acts as a transformative force, which is transmitted to a sliding jaw via a threaded coupling. As a result, the sliding jaw undergoes a linear motion that adjusts its position and effectively clamps the surface edge between the jaws of the mounting assembly.

With the apparatus securely attached, the method concludes at step 930 with the pivotal objective of collecting debris. As the debris becomes dislodged from the surface, the debris naturally accumulates within the elongate trough due to the open channel structure. The elongate trough's shape and strategic placement enable it to efficiently capture and contain debris of varying sizes, preventing it from spreading or scattering across the surrounding area.

Figure 10:
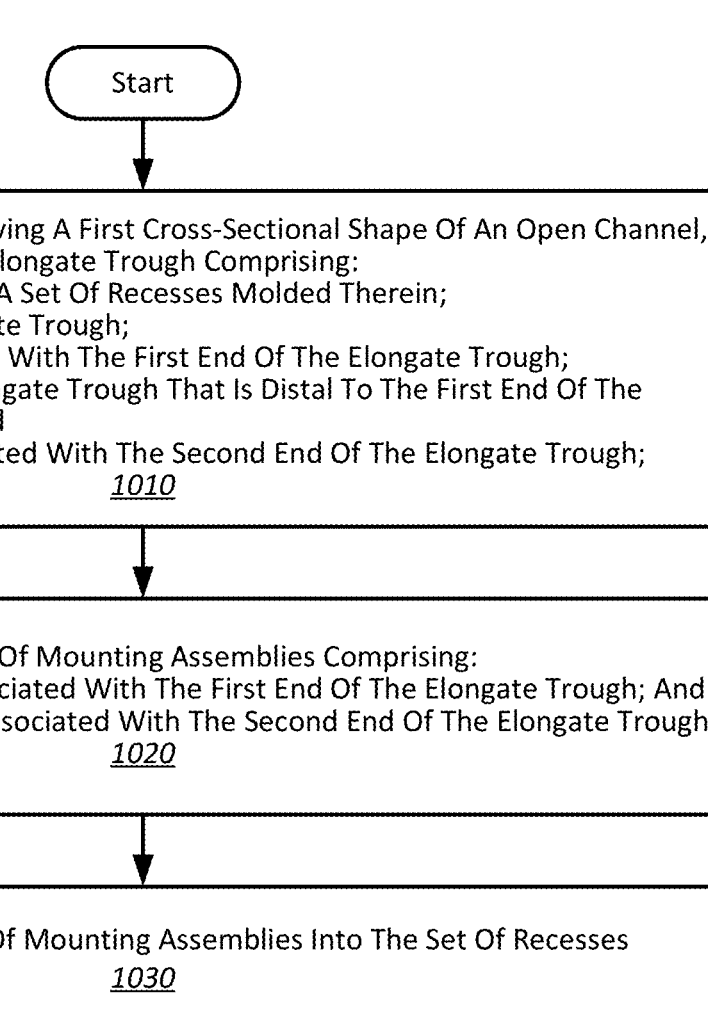
FIG. 10 is a method for manufacturing a debris collection apparatus shown according to one or more illustrative embodiments.

Referring now to FIG. 10, a method for manufacturing a debris collection apparatus is shown according to one or more illustrative embodiments. The method of FIG. 10 can be used to manufacture a debris collection apparatus, such as apparatus (100) of FIGS. 1-8.

At step 1010, an elongate trough is molded. The elongate trough is designed with a distinct cross-sectional shape resembling an open channel. This unique shape serves as a pivotal feature that enhances the apparatus's debris collection capabilities by effectively channeling and containing dislodged debris. The elongate trough is meticulously molded with an outer surface that includes a set of recesses, which are molded directly into the material.

Integral to the elongate trough are the endcaps, which are associated with its first and second ends, respectively. These endcaps serve as protective and reinforcing components that enclose and seal the extremities of the trough. By securely capping the open ends of the trough, the endcaps contribute to the prevention of debris leakage or escape, ensuring that collected debris remains contained within the channel-like structure.

At step 1020, a set of the set of mounting assemblies are molded. This set includes a first mounting assembly associated with the first end of the elongate trough, and a second mounting assembly associated with the second end of the elongate trough. The mounting assemblies are essential components that facilitate the secure attachment of the apparatus to surfaces, enabling effective deployment for debris collection activities.

At step 1030, the mounting assemblies are snap-fit into the recesses of the elongate trough. This assembly technique streamlines the attachment process, eliminating the need for complex fastening methods or external components. The snap-fit mechanism capitalizes on the precision molding of the recesses and the design of the mounting assemblies, resulting in a secure and efficient connection. The snap-fit assembly approach enhances the manufacturing process's efficiency, reducing the number of steps required for assembly and contributing to cost savings and consistent quality.

By snap-fitting the mounting assemblies into the elongate trough's recesses, the method ensures that the attachment is both secure and dependable. The interlocking mechanism creates a strong bond between the components, preventing unintended detachment during debris collection operations. This reliability is especially crucial as the apparatus may be subject to varying external forces and environmental conditions.

While the various steps in this flowchart are presented and described sequentially, at least some of the steps may be executed in different orders, may be combined, or omitted, and some of the steps may be performed in parallel. Furthermore, the steps may be performed actively or passively.

The term "about," when used with respect to a physical property that may be measured, refers to an engineering tolerance expected by or determined by one ordinary skill in the art. The exact quantified degree of an engineering tolerance depends on the product being produced, the process being performed, or the technical property being measured. For a non-limiting example, two angles may be "about congruent" if the values of the two angles are within ten percent of each other. However, if the ordinary artisan determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A could have been separate from component B, but is joined to component B in either a fixed or a removably attached arrangement. In a second meaning, unless otherwise stated, "connected to"

means that component A is integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the term "or" is an "inclusive or" and, as such, includes the term "and." Further, items joined by the term "or" may include any combination of the items with any number of each item, unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. An apparatus for collecting debris displaced from a surface, the apparatus comprising:
　an elongate trough having a first cross-sectional shape of an open channel, the elongate trough comprising:
　　a first end of the elongate trough;
　　a first endcap associated with the first end of the elongate trough;
　　a second end of the elongate trough that is distal to the first end of the elongate trough; and
　　a second endcap associated with the second end of the elongate trough;
　　a set of recesses in an outer surface of the elongate trough; and
　a set of mounting assemblies comprising:
　　a first mounting assembly associated with the first end of the elongate trough; and
　　a second mounting assembly associated with the second end of the elongate trough;
　wherein the set of mounting assemblies are snap-fit into the set of recesses in the outer surface of the elongate trough;
　wherein each mounting assembly of the set of mounting assemblies further comprises:
　　a clamp body comprising:
　　　a first end of the clamp body comprising:
　　　　a static jaw; and
　　　　a guide hole;

a second end of the clamp body that is distal to the first end of the clamp body, wherein the second end of the clamp body comprises:

a retention bore that is axially aligned with the guide hole;

a drive screw positioned in the guide hole and the retention bore, wherein the drive screw is freely rotatable; and a sliding jaw that is threadably coupled with the drive screw.

2. The apparatus of claim 1, wherein the elongate trough further comprises:

a baseplate extending between the first end and the second end;

a first sidewall, extending between the first end and the second end along a first edge of the baseplate and forming a first angle with the baseplate;

a second sidewall, extending between the first end and the second end along a second edge of the baseplate and forming a second angle with the baseplate, wherein the second angle is supplementary with the first angle.

3. The apparatus of claim 1, wherein each mounting assembly of the set of mounting assemblies is a threaded screw clamp.

4. The apparatus of claim 1, wherein the drive screw further comprises:

a head that is integrated with the drive screw proximate the first end of the clamp body, wherein rotation of the head actuates a linear motion of the sliding jaw along the drive screw.

5. The apparatus of claim 1, wherein each mounting assembly of the set of mounting assemblies further comprises:

an elastomeric pad attached to jaws of the set of mounting assemblies.

6. The apparatus of claim 1, further comprising:

a hatchway formed in at least one of the first endcap and the second endcap.

7. The apparatus of claim 1, further comprising:

at least one extensible member associated with at least one of the first end or the second end of the elongate trough, wherein:

the at least one extensible member has a second cross-sectional shape that is geometrically similar to the first cross-sectional shape;

the at least one extensible member is adjustably configurable between a collapsed position and an extended position;

the at least one extensible member is telescopically nested with the elongate trough; and the elongate trough further comprises a set of retention clips that are integrally formed with an upper edge of at least one of the elongate trough or the extensible member, wherein:

the set of retention clips are configured to slidably engage the elongate trough with the extensible member; and the set of retention clips are configured to restrict movement to an extensible dimension when the extensible member is in the extended position.

8. The apparatus of claim 7, wherein the set of mounting assemblies snap-fit into a set of recesses in an outer surface of the extensible member.

9. The apparatus of claim 7, further comprising:

at least one extensible girder attached to an outer surface of the elongate trough, wherein the at least one extensible girder is configured to coextend with the extensible member between the collapsed position and the extended position.

10. A method of collecting debris, the method comprising:

positioning an elongate trough along an edge of a surface, wherein the elongate trough has a first cross-sectional shape of an open channel and comprises a first mounting assembly associated with a first end of the elongate trough, and a second mounting assembly associated with a second end of the elongate trough;

a set of recesses in an outer surface of the elongate trough, wherein the first mounting assembly and the second mounting assembly are snap-fit into the set of recesses;

for each mounting assembly, rotatably adjusting a head of a drive screw to secure the surface between jaws of the mounting assembly, wherein rotation of the head actuates a linear motion of a sliding jaw that is threadably coupled with the drive screw; and collecting debris that displaced from the surface within the elongate trough.

11. A method of manufacturing a debris collection apparatus, comprising:

molding an elongate trough having a first cross-sectional shape of an open channel, the elongate trough comprising:

an outer surface having a set of recesses molded therein;

a first end of the elongate trough;

a first endcap associated with the first end of the elongate trough;

a second end of the elongate trough that is distal to the first end of the elongate trough; and a second endcap associated with the second end of the elongate trough;

molding a set of mounting assemblies comprising:

a first mounting assembly associated with the first end of the elongate trough; and a second mounting assembly associated with the second end of the elongate trough;

wherein each mounting assembly of the set of mounting assemblies further comprises:

a clamp body comprising:

a first end of the clamp body comprising:

a static jaw; and a guide hole;

a second end of the clamp body that is distal to the first end of the clamp body, wherein the second end of the clamp body comprises:

a retention bore that is axially aligned with the guide hole;

a drive screw positioned in the guide hole and the retention bore, wherein the drive screw is freely rotatable; and a sliding jaw that is threadably coupled with the drive screw;

and snap-fitting into the set of mounting assemblies into the set of recesses.

* * * * *